(12) United States Patent
Safavi-Naeini et al.

(10) Patent No.: US 12,007,602 B2
(45) Date of Patent: Jun. 11, 2024

(54) QUANTUM ENHANCED OPTICAL MODULATOR OR SENSOR

(71) Applicant: The Board of Trustees of the Leland Stanford Junior University, Stanford, CA (US)

(72) Inventors: Amir H. Safavi-Naeini, Palo Alto, CA (US); Timothy Patrick McKenna, San Francisco, CA (US); Hubert S. Stokowski, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

(21) Appl. No.: 17/740,027

(22) Filed: May 9, 2022

(65) Prior Publication Data

US 2022/0373735 A1    Nov. 24, 2022

Related U.S. Application Data

(60) Provisional application No. 63/185,628, filed on May 7, 2021.

(51) Int. Cl.
*G02B 6/12*      (2006.01)
*G02B 6/293*     (2006.01)

(52) U.S. Cl.
CPC ..... *G02B 6/12004* (2013.01); *G02B 6/12007* (2013.01); *G02B 2006/1204* (2013.01); *G02B 2006/12138* (2013.01); *G02B 2006/12142* (2013.01); *G02B 6/29344* (2013.01)

(58) Field of Classification Search
CPC ............ G02B 6/12004; G02B 6/12007; G02B 6/29344; G02B 2006/1204; G02B 2006/12138; G02B 2006/12142
USPC ........................................................... 385/14
See application file for complete search history.

(56) References Cited

U.S. PATENT DOCUMENTS

2019/0339587 A1* 11/2019 Vernon ................. G02F 1/3556

OTHER PUBLICATIONS

Burd et al., "Quantum amplification of mechanical oscillator motion", 2019, Science 364, 1163-1165.
Plick et al., "Coherent-light-boosted, sub-shot noise, quantum interferometry", 2010, New Journal of Physics 12 083014.
Lawrie et al., "Quantum sensing with squeezed light", 2019, DOE report.

(Continued)

*Primary Examiner* — Jerry M Blevins
(74) *Attorney, Agent, or Firm* — LUMEN PATENT FIRM

(57) ABSTRACT

In an integrated optical device, squeezed light is used internally to effectively increase an optical modulation effect. One exemplary device operates by squeezing the light at the input, then sending it through an electro-optic stage where its phase picks up the signal of interest, and finally anti-squeezing it to obtain a displaced coherent state. Thus the displacement is amplified by the level of squeezing that is achieved inside the device and it is thereby less sensitive to loss. Since this device behaves simply as an electro-optic modulator, albeit one with an exponentially enhanced sensitivity, no extra considerations are needed to integrate the modulator into a system. Such devices can be operated as modulators or as sensors, and can make use of optical phase shift effects other than the electro-optic effect.

7 Claims, 4 Drawing Sheets

(56) References Cited

OTHER PUBLICATIONS

Liu et al., "Squeezing-enhanced fiber Mach-Zehnder interferometer for low-frequency phase measurement", 2017, Applied Physics Letters 110, 021106.
Liu et al., "Optimal phase sensitivity by quantum squeezing based on a Mach-Zehnder interferometer", 2020, New J. Phys. 22 013031.

\* cited by examiner

QUANTUM ENHANCED OPTICAL MODULATOR OR SENSOR

CROSS REFERENCE TO RELATED APPLICATIONS

This application claims the benefit of U.S. provisional patent application 63/185,628, filed on May 7, 2021, and hereby incorporated by reference in its entirety.

GOVERNMENT SPONSORSHIP

This invention was made with Government support under contract FA9550-18-1-0379 awarded by the Air Force Office of Scientific Research, and under contract W911NF-18-1-0103 awarded by Department of the Army, and under contract D19AP00040 awarded by Defense Advanced Research Projects Agency. The Government has certain rights in the invention.

FIELD OF THE INVENTION

This invention relates to optical modulators and/or sensors.

BACKGROUND

Currently, electro-optic modulators are widely used in communications, sensing, and computing to encode electrical signals onto optical fields. They have also been used in mm-wave and sub-mm communications, imaging and radar and to create sensors for passive thermal imaging in degraded visual environments. Nonetheless, the required power and achievable sensitivity of these detectors remains below what is possible with electronic amplifiers, and also falls far short of that predicted to be possible optically by the limits of quantum mechanics. Fundamentally, this is because current electro-optic materials have limited sensitivity, and the states of light used in these sensors are coherent states which are not optimized to detect phase shifts. Accordingly, it would be an advance in the art to provide improved optical modulators and/or sensors.

SUMMARY

To improve electro-optic modulators one can either improve their materials and device geometry—the route commonly pursued—or, as we will consider in this work, engineer the quantum optical field used within them. In current realizations, the coherent classical laser field sent through the modulator has uncertainty in its phase, which manifests as shot-noise in a phase-sensitive measurement.

To reduce this noise relative to the signal, the optical power must be increased, but this can only be done practically up to a certain limit. Though quantum light with non-classical correlations has been proposed as a way to reduce the shot-noise at a detector, such schemes have not been practical due to their extreme sensitivity to loss. For example a 3 dB loss in the detection chain would limit us to at most a 3 dB enhancement of the quantum sensor regardless of level of squeezing.

In this work we consider a device that uses quantum engineered states and interactions to detect electromagnetic waves with a sensitivity and bandwidth beyond that possible with current technology. Such an advance will lead to an increase in performance across a wide array of systems in terms of size, weight, and power. Our approach is to implement an electro-optic modulator that uses 'squeezed' states of light to increase its sensitivity. Squeezed states of light have been recently used to significantly improve measurements in the km-scale gravitational wave laser interferometer LIGO, but have yet to find wider use in more practical and widely deployed sensors. Integrating a scaled down squeezed state generator and with an electro-optic sensor on the same chip enables a vastly more robust realization of a quantum sensor that we will use to achieve a significant 10-100 times enhancement in sensitivity over current classical technology. With these advances, it will become possible to make quantum sensors deployable in technologically relevant settings.

Our approach is to implement an on-chip device which uses squeezed light internally to generate a large electro-optic effect. Our device operates by squeezing the light at the input, then sending it through the electro-optic stage where its phase picks up the signal of interest, and finally anti-squeezing it to obtain a displaced coherent state. Thus the displacement is amplified by the level of squeezing that would be achievable inside the device and it would be less sensitive to loss. Since this device behaves simply as an electro-optic modulator, albeit one with an exponentially enhanced sensitivity, no extra considerations are needed to integrate the modulator into a system. The deleterious effects of loss are significantly reduced: a 3 dB loss in the detection chain, given 20 dB of internal squeezing would result in a slightly reduced but still impressive 17 dB quantum enhancement.

Applications include but are not limited to receiving antennas (in particular phased arrays) as widely used in communications, radar and passive imaging. Increased sensitivity would significantly reduce power consumption and enable sensors that may be worn, or mounted on lightweight platforms (space or autonomous).

Significant advantages are provided. For example, a competing technology for passive imaging is outlined below which uses RF pre-amplification. Squeezing as in this work may remove the need for pre-amplification which would significantly reduce the size and power consumption of such imaging.

Although the specific example of this work relies on the electro-optic effect, it is expected that other physical effects could be used, such as the acousto-optic effect. In general it is expected that any physical effect that can phase shift light propagating in a waveguide mode can be used in this kind of squeezer-modulator-anti-squeezer architecture to provide more efficient modulators.

The example of this work is a modulator, but the same principles can also be used to make a sensor for an unknown signal. This is because any optical modulator device can be operated as a sensor by providing the unknown signal to its modulation input. The result is an optical sensor of the unknown signal.

Accordingly, an exemplary embodiment of the invention is apparatus including:

i) a squeezer configured to transform input coherent-state light to input squeezed-state light;

ii) a passive waveguide splitter configured to receive the input squeezed-state light, and configured to output first squeezed-state light and second squeezed-state light;

iii) a phase shifter configured to impose a relative phase shift between the first squeezed-state light and the second squeezed-state light according to an input of the phase shifter;

iv) a passive waveguide combiner configured to receive the first squeezed-state light and the second squeezed-state light from the phase shifter, and configured to provide output squeezed-state light; and v) an anti-squeezer configured to receive the output squeezed-state light and configured to provide output coherent-state light.

Preferably, the squeezer, the passive waveguide splitter, the phase shifter, the passive waveguide combiner and the anti-squeezer are all included in an integrated photonic circuit having a waveguide-coupled optical input and having a waveguide-coupled optical output. The integrated photonic circuit is preferably a lithium niobate integrated photonic circuit. The passive waveguide splitter is preferably multi-mode interference device. The passive waveguide combiner is preferably a multi-mode interference device.

The phase shifter can be a phase modulator, where the input to the phase shifter is a provided electrical signal. In this case the apparatus is a modulator that modulates the output coherent-state light according to the provided electrical signal.

The phase shifter can be a phase sensor, where the input to the phase shifter is an unknown signal. In this case, the apparatus is a sensor of the unknown signal using the output coherent-state light.

DETAILED DESCRIPTION

A) Introduction

Figure 1:
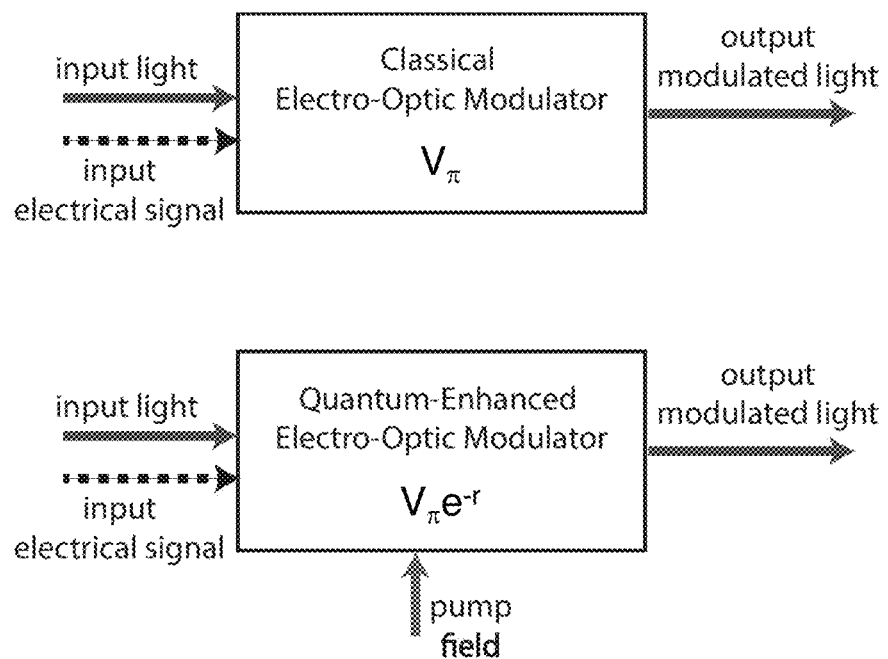
FIG. 1 is a block diagram comparison of a conventional modulator to a modulator of this work.

We describe a Quantum-Enhanced Electro-Optic Sensor (QEOS). By using quantum interactions inside an electro-optic modulator, we expect to improve its sensitivity to an RF field over a broad bandwidth (1-300 GHz). In contrast to pre-amplification of the RF signal, or post-amplification of the optical signal, our approach has no added noise. It is also naturally broadband, though power consumption can be significantly reduced by resonating the light and reducing the bandwidth. To place our approach into proper context, the sections below will outline some of the key background on electro-optic (EO) devices, sensors, nonlinear quantum interactions, and the advances in integrated thin film lithium niobate photonics which enables our approach.

A1) Electro-Optic Modulation

Currently, electro-optic modulators (EOMs) are widely used in communications, sensing, and computing to encode electrical signals onto optical fields. An important class of these modulators use electrorefraction, the voltage-dependent change in the refractive index of the material, to modulate the phase of light with an incoming signal. These modulators in principle provide full control over the amplitude and phase of optical signals, as long as they do not induce excess loss on the optical field. They are therefore widely used in high-bandwidth EO (electro-optic) systems and sensors. They have also been important in enabling sensors in the millimeter- and sub-mm-wave range that can be easily arrayed to form large apertures and passively generate images at video rate.

An important figure of merit for electro-optic modulators is their $V_\pi L$—the voltage required to impart a $\pi$ phase shift on the light field propagating through a waveguide of length L. State-of-the-art systems achieve $V_\pi L$ of roughly 2 V cm over a bandwidth approaching 100 GHz with an insertion loss of less than 10%. It is often advantageous to make the modulator longer, as the increased interaction length reduces the voltage needed to obtain a phase shift of the light field. In a communications system where energy-per-bit is the important figure of merit, the energy consumption is then reduced by $1/L^2$. But scaling the length of the structure may not always be possible, as loss and attenuation limits the maximum length of the device, and the size/footprint of the device may also become important for many applications. Currently, the main approach to reducing the $V_\pi$ of a modulator is to implement an optical resonator to increase the effective path length. This approach has its limitations, as it reduces the modulator bandwidth and increases the complexity of the system.

A2) Exemplary Application: Electro-Optic Sensors for Passive Imaging and Radar

Improving electro-optic modulators has broad technological impact. In this example, we focus on a specific application of EOMs to phased array RF radar systems. In particular we consider passive mm- and sub-mm-wave imaging systems that can provide high resolution and rate images in degraded visual environments—environments with significant amounts of dust, fog, smoke and over varying amounts of relative humidity.

A remarkably capable technology that has been demonstrated to do passive imaging in the 35 GHz, 77 GHz, and 95 GHz bands is the electro-optic imager developed by Phase Sensitive Innovations (PSI) Inc. and the University of Delaware group. In these systems, arrays of antenna-coupled EOMs passively sense a thermal signal from the environment, which is then filtered and combined onto a SWIR detector to form an image. It is extremely difficult to achieve the required sensitivity with a purely electro-optic sensing approach. This is due to the insufficient conversion efficiency from mm-wave to optical photons $\eta_c$ (see equation 2.17). The conversion efficiency increases linearly with laser power, but sufficient conversion efficiency to realize video-rate imaging with an acceptable thermal resolution would require significantly more optical power than is practical. Therefore the approach pursued by the Delaware/PSI group uses an electronic pre-amplification stage at the aperture that integrates several LNAs (low noise amplifiers) into a waveguide structure leading to the modulator. Depending on the realization, these modulators provide 30-60 dB gain over a bandwidth of a few GHz. The small bandwidth is also useful—to avoid washing out fringes from off-axis illumination, a bandwidth B satisfying $$\frac{B}{2\pi} < \frac{c_0}{D\sin\theta} \quad (1.1)$$

where D is the aperture size needed. After amplification and modulation, the light is then sent through an optical processor which corrects the phase drift, filters the carrier, and forms an image.

For a quantum enhancement at the modulator to be useful in this setting, the advantage must be robust to the complex optical signal processing tasks. Our approach satisfies this important requirement and can therefore be applied to this and to a wide array of other electro-optic systems.

So why would we want to use a more sensitive modulator (as described here) instead of pre-amplifying the signal as demonstrated by the PSI/Delaware effort?

1) The first major advantage is bandwidth. EO modulation can be achieved over a very broad bandwidth, and even when it is resonantly enhanced, the frequency of the resonant enhancement can be tuned by electrically tuning the optical cavity frequencies as we have demonstrated in lithium niobate. This is in contrast to current mm-wave amplifiers which have fixed frequency and are used in specialized structures which resonate or filter their response in a static way. Both bandwidth and tuning are important because they increase sensitivity (P=kTB for a passive imager) to broadband thermal noise, and make the system more versatile in a contested electromagnetic environment. By having the option to keep the whole spectrum, we also open the door to multi-spectral imaging.

2) The second advantage is robustness and reduced power. Placing a sensitive chain of LNAs at the radio front-end (on the aperture or focal plane) makes the system as a whole sensitive to electromagnetic pulses and strong transient signals. Such amplifiers also consume significant amounts of power. Optical modulators are immune to such transients, and all electronics can be shielded and fed by fiber optics from the aperture plane. By using squeezing, we remove the need for LNAs with only a modest cost in optical power for the pumped nonlinear optical processes. Moreover as mentioned before, systems utilizing LNAs will typically target a specific narrow band of frequency (this is also to remove the effect of side lobes). Frequencies of the optical processes are much more easily tunable—making the system more frequency-agile.

3) We expect that achieving a >10-20 dB improvement in modulator sensitivity will open the route for new and disruptive systems innovations. Since our approach can provide a fully integrated device, and increased sensitivity could mean lower power and smaller modulators, we envision dense arrays of smaller modulators with large bandwidth forming wafer-scale arrays. Fully fabricated wafer-scale receivers with dense array spacing may significantly reduce the SWaP (size, weight and power) needed for passive imaging in the >100 GHz range, and reduce costs to enable deployment of passive high-speed, high-resolution imaging on platforms that are currently not considered, including autonomous and space-based systems. The quantum enhanced sensor of this work is a component that would enable such a vision.

A3) Development of the Thin-Film Lithium Niobate Platform

Our approach makes use of material properties such as low optical loss and large EO and $\chi^{(2)}$ nonlinear optical processes. Lithium niobate (LN) is sometimes called the "silicon of photonics" due to its versatility and importance in optical systems. This is because of its wide transparency window, extremely low optical loss, as well as excellent acousto-optic, nonlinear optical, and electro-optic properties. Thus lithium niobate is a preferred material system for embodiments of the invention.

The most successful current incarnations of LN devices use proton exchange or diffusion to define low-index-contrast waveguides in wafers cut from bulk boules of LN. Increasing the demands on device performance, size, and weight, have led to the development of thin-film lithium niobate (TFLN) platforms that support high index-contrast waveguides made by etching ridges into a thin film of LN bonded to a lower index substrate (as in the example of FIG. 3A).

A3.1) Low Loss Optical Modulators and Nonlinear Devices

Optical losses in etched TFLN waveguides have progressively improved in the last few years, and now can be <1 dB/cm. In addition, low loss couplers and modulators have been demonstrated with $V_\pi L \approx 2V$ cm. Our group has recently led efforts towards realizing ultra-efficient resonant electro-optic converters for quantum transduction.

More recently, photonic circuits built directly from the $\chi^{(2)}$ nonlinear LN have been demonstrated. In addition to supporting high-Q optical resonances and Kerr nonlinearity, LN can be periodically poled to compensate for phase mismatch due to dispersion. We have shown quasi-phase-matching within a nonlinear optical resonator and demonstrated optical parametric oscillation and efficient second-harmonic generation on chip.

The resonant electro-optic and nonlinear optical interactions demonstrated on thin-film LN are important building blocks for the work that we describe.

A4) Quantum Enhancement with Squeezing

A4.1) Quantum Sensing with Squeezed Radiation: Principles and Opportunities

We consider improving electro-optic modulators by the use of quantum squeezing. This approach is based on the increased sensitivity afforded by squeezed states for parameter estimation. We briefly outline below the advantages of squeezed states and how they are typically used in measurements. We then explain some of the challenges involved in obtaining these advantages in practical system, and outline how our approach mitigates these issues.

A4.1.1) Coherent States and Standard Quantum Limit

A coherent state with an average of N photons propagating through an electro-optically-induced phase shift $\phi=\pi V/V_\pi$ is displaced by $\alpha=\sqrt{N}\phi$. The resulting quantum state of the optical field is then $$|\psi\rangle = \hat{D}(\alpha)|0\rangle.$$

Here we are assuming a MZ (Mach-Zehnder) configuration which causes the modulation to couple into a different mode of the waveguide, displacing it from vacuum. To determine the phase $\phi$, we can make measurements of the observable $\hat{X}/\sqrt{N}=(\hat{a}+\hat{a}^\dagger)/2\sqrt{N}$. This is in fact the optimal estimator for the phase. The mean value of this observable is the phase $\phi$, while its standard deviation due to vacuum fluctuations of the electromagnetic field is $$\delta\phi = \frac{1}{2\sqrt{N}}$$

This scaling of phase sensitivity with $N^{-1/2}$ is referred to as the Standard Quantum Limit (SQL). In an electro-optic modulator the phase $\phi=(\pi/V_\pi)\times V$ is a function of the modulator's sensitivity $V_\pi$. Improving the measurement then entails either reducing $V_\pi$ or increasing N.

A4.1.2) Squeezed States and the Heisenberg Limit

Quantum correlations in squeezed states provide enhanced sensitivity by reducing the noise in the variable being sensed. In particular, if a squeezed state $\hat{S}(\zeta)|0\rangle$ of the optical field is fed into an electro-optic phase shifter instead of the vacuum state, the resulting state at the output becomes $$|\psi\rangle = \hat{D}(\alpha)\hat{S}(\zeta)|0\rangle.$$

The mean value of the same estimator as in the previous paragraph is still the phase ϕ, but now the imprecision in the phase is reduced exponentially to $$\delta\phi = \frac{e^{-r}}{2\sqrt{N}},$$

where r=|ζ| is the squeezing parameter. In the limit of large squeezing, where $e^{2r} \approx N$, we obtain an imprecision that scales as $\delta\phi \propto N^{-1}$. This is called Heisenberg scaling. Typically lower levels of squeezing are used. In a homodyne measurement used to estimate the phase, injection of squeezed light into the detection setup causes the shot-noise to drop below that of vacuum by squeezing=20r log$_{10}$(e) dB.

The magnitude of this drop is commonly used to characterize the level of squeezing. State-of-the-art squeezers have achieved 15 dB of squeezing.

A4.2) Challenges in Quantum Sensing, and Advantages of the Present Approach

There are multiple challenges in developing quantum sensors that take advantage of squeezed light. As we will outline below, our approach will take advantage of a few recent advances in integrated photonics, as well as an approach which obviates detection requirements and makes the sensor much more practical and widely applicable in a system.

A4.2.1) Generating Squeezed Light

The first step is generating bright squeezed states. Currently squeezed states with 15 dB of squeezing have been generated using $\chi^{(2)}$ interactions. On-chip squeezing levels have been far lower, due to the lack of a second order nonlinear photonic platform. For example approaches based on $\chi^{(3)}$ have been typically limited since a strong pump must be used which needs to be placed very close in frequency to the light that is being squeezed. This leads to excess noise that limits the squeezing possible. Despite significant efforts from academia, industry, and national labs over the last decade, the highest levels of squeezing achieved remain much lower than 10 dB (on chip). Our approach will use a newly developed $\chi^{(2)}$ nonlinear optical platform made from lithium niobate which supports extremely high bandwidth and low-loss nonlinear optical interactions. By using $\chi^{(2)}$ we can use a significantly weaker pump which is detuned from the squeezed light by an optical frequency. This should enable achieving the high levels of squeezing that have been realized in the bulk platforms.

A4.2.2) Minimizing Losses

Losses are the primary road-block to deploying devices that enhance measurement sensitivity using squeezed states. A squeezed state interferometer with 10% total loss going from the source, through the interferometer, and into the detector, will be limited to at most 10 dB of squeezing. With a more realistic dB-level insertion loss at each stage, the value of squeezing is rapidly made negligible. This is particularly problematic in systems where different components are on different chips, as highly efficient and scalable chip-to-chip and chip-to-fiber couplers remain a challenge in the field. Interestingly, the recent development of extremely low-loss thin-film lithium niobate photonic devices with record-high electro-optic and nonlinear-optic interaction strengths means that in principle, both the squeezer and EO modulator can be cointegrated on the same chip. Our approach combines all stages of the sensor on the same chip, eliminating the need for high-loss interfaces. This greatly increases the useable squeezing and its sensitivity.

A4.2.3) Detection Noise

Phase noise, detector dark noise, and excess noise all impair the squeezing in a device. Extremely high quantum efficiency detectors have thus been developed for these experiments. Achieving low phase and excess noise becomes harder at lower frequency offsets from the carrier, while at higher frequency, beating the detector dark noise becomes a challenge due to limits to gain-bandwidth of amplifiers in the RF side. Our approach completely eliminates the need to detect the squeezed light directly. This leads to a massive simplification of the detection chain, and leads to a device that is compatible with current electro-optic sensors detection chains and can be readily integrated into existing systems and system architectures.

B) Squeezing to Reduce Modulator $V_\pi$

FIG. 1 shows the approach outline in block diagram form. On the top a typical classical EO device is shown with input light and input RF signals entering from the left, and the output modulated light exiting from the right side. The important figure of merit for a low-loss modulator is its $V_\pi$. Our quantum enhanced modulator (bottom of FIG. 1) can either take as an additional input a pump field, or it can generate a pump field internally. Either way, the result is a reduced $V_\pi$.

Figure 2:
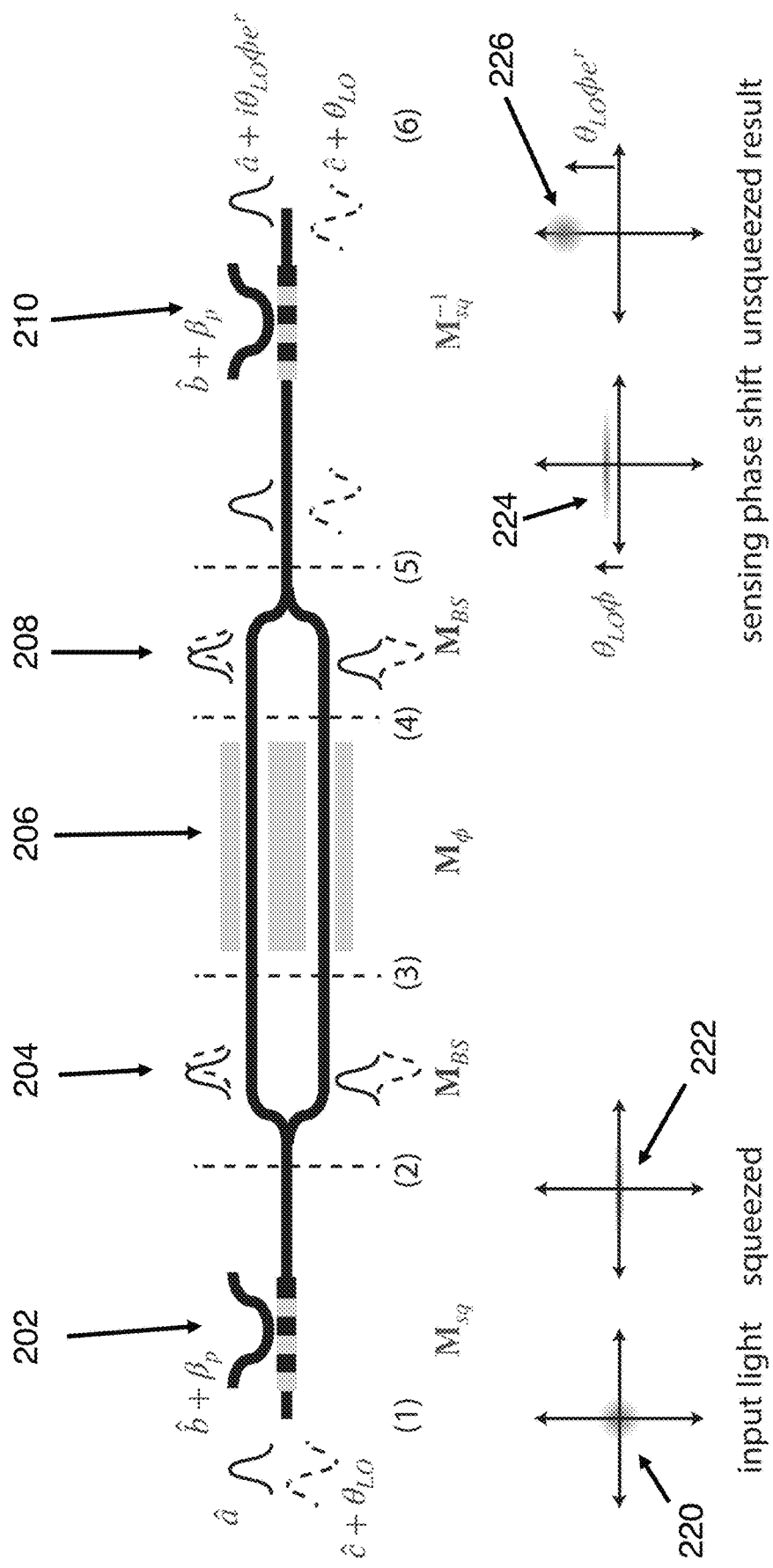
FIG. 2 shows operation of a device according to principles of the invention.

The signal path is shown on FIG. 2. Input coherent-state light 220 containing vacuum fluctuations is injected into a squeezer 202 which reduces fluctuations in the Y quadrature to provide squeezed-state light 222. Modulation (e.g., with a Mach-Zehnder modulator having passive waveguide splitter 204 followed by phase shifter 206 followed by passive waveguide combiner 208) causes a displacement of this field to provide output squeezed-state light 224. The anti-squeezer 210 undoes the squeezing of the first stage 202, thereby providing output coherent-state light 226. This device operation is described in more detail below.

B1) Squeezing-Enhanced EO Detection

Our approach removes the need to detect the squeezed light by placing the EO phase shifter between a squeezer and anti-squeezer segment as described above. The resulting state of the optical field is then $$|\psi\rangle = \hat{S}(-\zeta)\hat{D}(\alpha)\hat{S}(\zeta)|0\rangle \quad (2.1)$$

Here $\hat{S}(-\zeta)$ is the anti-squeezing, $\hat{D}(\alpha)$ is the EO phase shift and $\hat{S}(\zeta)$ is the squeezing. These operators can be multiplied together, which gives $$|\psi\rangle = \hat{D}(\alpha')|0\rangle \quad (2.2)$$

which is simply a coherent state with an increased displacement of $$\alpha' = e^r \alpha \quad (2.3)$$

In other words, by performing both squeezing and anti-squeezing, we obtain a coherent state that contains the phase shift that is exponentially enhanced in the squeezing parameter r. As in a regular EO phase shifter, the resulting state is simply a coherent state, which means that this device can be a drop-in replacement in a system without needing to significantly rework the detection chain to support low noise measurement of quadrature squeezing. Taken as a black-box, this system appears as a modulator with a reduced $V_\pi' = e^{-r} V_\pi$.

B2) Analysis

The device includes three sections. A squeezer, an electro-optic modulator in a Mach-Zehnder interferometer, and a second squeezer (anti-squeezer) which acts to cancel the squeezing from the first stage. A schematic is shown on FIG. 2. Here we describe the evolution of the optical signal from the input (1) to the output (6) as shown on FIG. 2.

Starting from the left, two of the modes of the waveguide â and ĉ are considered. In the Heisenberg picture, we can represent the operators for the optical field as a vector $$\underline{v} = \begin{pmatrix} \hat{a} \\ \hat{c} \\ \hat{a}^\dagger \\ \hat{c}^\dagger \end{pmatrix}. \tag{2.4}$$

These modes are at the same optical frequency (the fundamental harmonic, FH), but have different spatial distributions.

At point (1) on FIG. 2 we have a strong laser beam with photon number or flux $\theta_{LO}$ that is injected into the ĉ mode:

$$\underline{v}_{in} = \begin{pmatrix} \hat{a} \\ \hat{c} + \theta_{LO} \\ \hat{a}^\dagger \\ \hat{c}^\dagger + \theta_{LO}^* \end{pmatrix}. \tag{2.5}$$

From (1) to (2) on FIG. 2, these fields then propagate through a periodically poled region with a quasi-phase-matched (QPM) grating. The QPM pitch is designed so that excitation at a second harmonic (SH) pump squeezes the a mode, which is in the vacuum state before this. The interaction with the SH is confined to this region, and the SH mode is removed after this. The result of this squeezing stage is captured by the action of an operator $$M_{sq} = \begin{pmatrix} \cosh r & 0 & -\sinh r & 0 \\ 0 & 1 & 0 & 0 \\ -\sinh r & 0 & \cosh r & 0 \\ 0 & 0 & 0 & 1 \end{pmatrix}. \tag{2.6}$$

From (2) to (3) on FIG. 2, the light field arrives at a low-loss junction which converts the â and ĉ modes into even and odd superpositions in the fundamental excitation of two spatially separated waveguides. In the Heisenberg picture, this beam splitter operation is modelled by the action of a matrix $$M_{BS} = \frac{1}{\sqrt{2}} \begin{pmatrix} 1 & 1 & 0 & 0 \\ 1 & -1 & 0 & 0 \\ 0 & 0 & 1 & 1 \\ 0 & 0 & 1 & -1 \end{pmatrix}. \tag{2.7}$$

From (3) to (4) on FIG. 2, the light field then propagates through a region with electrodes. The light in the top/bottom waveguides gain a phase $e^{\pm i\phi}$ respectively in this electrode configuration, leading to a transfer matrix $$M_\phi = \begin{pmatrix} e^{i\phi} & 0 & 0 & 0 \\ 0 & e^{-i\phi} & 0 & 0 \\ 0 & 0 & e^{-i\phi} & 0 \\ 0 & 0 & 0 & e^{i\phi} \end{pmatrix}, \tag{2.8}$$

and where the phase $\phi = \pi V/V_\pi$. After this, propagation from (4) to (5) on FIG. 2 through the combiner is captured by matrix $M_{BS}$, and propagation from (5) to (6) on FIG. 2 is captured by matrix $M_{sq}^{-1}$.

Finally, for the output, we obtain $$\underline{v}_{out} = M_{sq}^{-1} M_{BS} M_\phi M_{BS} M_{sq} \underline{v}_{in}, \tag{2.9}$$

which in the limit of small $\phi$ leads to $$\hat{a} \rightarrow \hat{a} + i\theta_{LO}\phi e^r \tag{2.10}$$

showing that at the output of this modulator, we have a coherent state with an enhanced phase offset of $\phi e^r$.

FIG. 2 shows a situation where the phase modulation is of the squeezed quadrature component of the field. In order to ensure this alignment of squeezing to modulation, the waveguide between the squeezer and the modulator needs to be phase-stable. Fortunately, in the preferred integrated photonic chip embodiment described below, sufficient phase stability of this optical connection is expected. In addition, the theta parameter in Eq. 2.13 must be set correctly in the squeezer to align the squeezing to the modulation. Theta is determined by the optical phase of the pump provided to the squeezer. The theta parameter for the anti-squeezer differs from that of the squeezer by pi/2, which is achieved by a pi/2 difference in pump phase in the same device structure as the squeezer. In practice, it is expected that theta for the squeezer and theta for the anti-squeezer will both be adjusted to maximize the $V_\pi$ reduction. This is at least because optical path lengths between the squeezer and modulator, and between the modulator and the anti-squeezer are both relevant, and are unlikely to be known a priori with sufficient accuracy for open-loop setting of the squeezing and anti-squeezing phases.

B3) Chip-Scale Implementation

B3.1) Waveguide Squeezing Design

Squeezing of a field quadrature at the fundamental wavelength occurs due to the $\chi^{(2)}$ nonlinear coupling between fundamental and second harmonic field amplitudes in the waveguide, A and B respectively. The coupled equations read $$\frac{\partial A}{\partial z} = \sqrt{\eta} A^* B \tag{2.11}$$

$$\frac{\partial B}{\partial z} = \sqrt{\eta} A^2 \tag{2.12}$$

where $\eta$ is the SHG efficiency normalized by the fundamental input power and the length of the waveguide (units: %/(Wcm$^2$)) valid in the undepleted pump approximation. We calculate the slope efficiency $\eta$ via finite element simulations of the fundamental and second harmonic spatial waveguide modes and perform an overlap integral with the $\chi^{(2)}$ nonlinear tensor of lithium niobate.

Figure 3A:
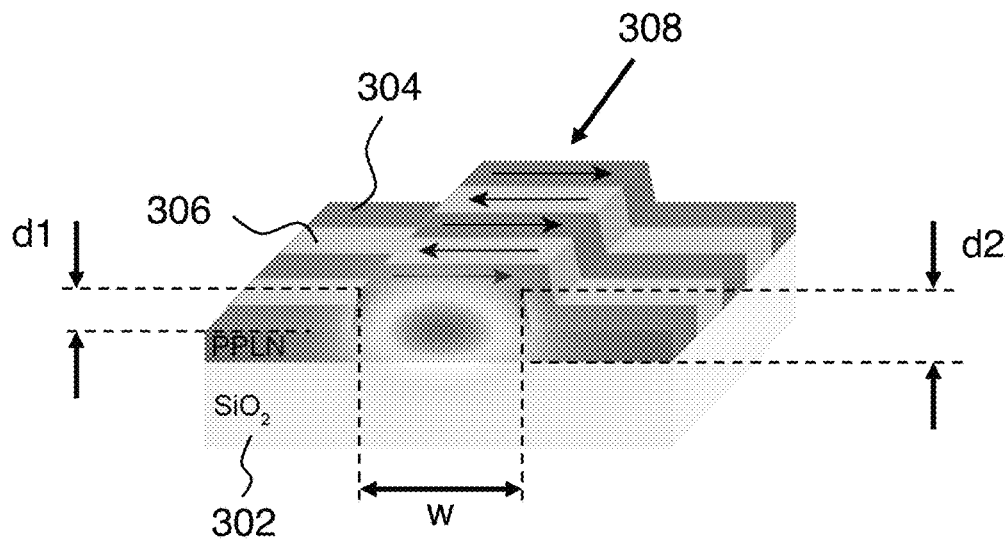
FIG. 3A shows an exemplary waveguide geometry.

FIG. 3A shows an exemplary ridge waveguide structure in PPLN (periodically poled lithium niobate). Here 302 is an SiO$_2$ substrate, 308 is a ridge waveguide in lithium niobate, and two of the periodically reversed ferroelectric domains characteristic of PPLN are referenced as 304 and 306. In a simulation with a ridge width w of 1.2 μm, d1=300 nm and d2=500 nm, $\eta$ was 4,900%/(Wcm$^2$).

Figure 3B:
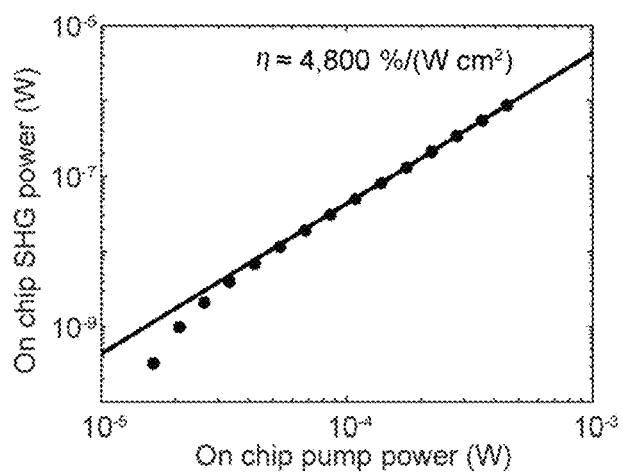
FIG. 3B shows measured second harmonic generation efficiency in a waveguide device.

We have recently fabricated a similar waveguide and achieved a measured SHG slope efficiency of 4,800%/(Wcm$^2$), as shown in FIG. 3B.

Figure 3C:
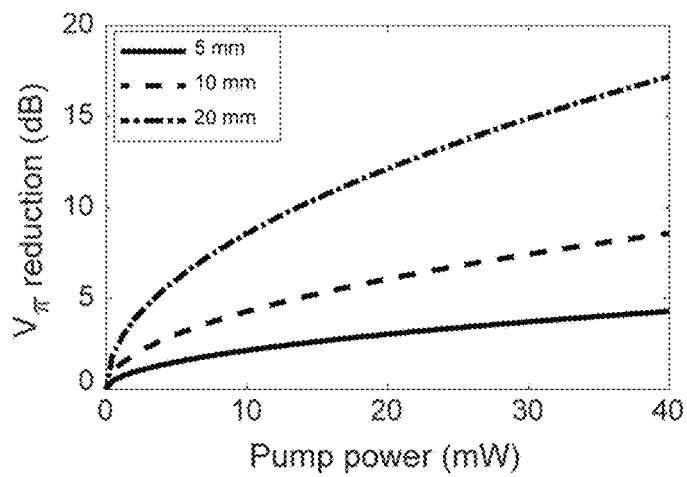
FIG. 3C shows simulated $V_\pi$ reduction for various pump powers and device lengths of the squeezer and anti-squeezer.

When the second harmonic field B is driven by a strong classical pump with amplitude β, optical parametric amplification of the fundamental field results in the field quadrature at phase angle θ to be $$\hat{X}_\theta(z) = \hat{X}(0)e^r \cos\theta + \hat{Y}(0)e^{-r}\sin\theta \quad (2.13)$$

where $\hat{X}(0)$ and $\hat{Y}(0)$ are the initial unsqueezed orthogonal field quadratures of vacuum. Here the squeezing parameter r is given by $r = \sqrt{\eta}\beta$. FIG. 3C shows that we expect >5 dB improvement of $V_\pi$ using a 10 mm long waveguide and 30 mW of pump power into the squeezers. If we use a 20 mm long squeezing waveguide, we can achieve >10 dB $V_\pi$ improvement with 30 mW of pump power. The $V_\pi$ enhancement can be adjusted on-the-fly by changing the pump power to the squeezing section.

B3.2) Mach-Zehnder Modulator Design

Figure 4:
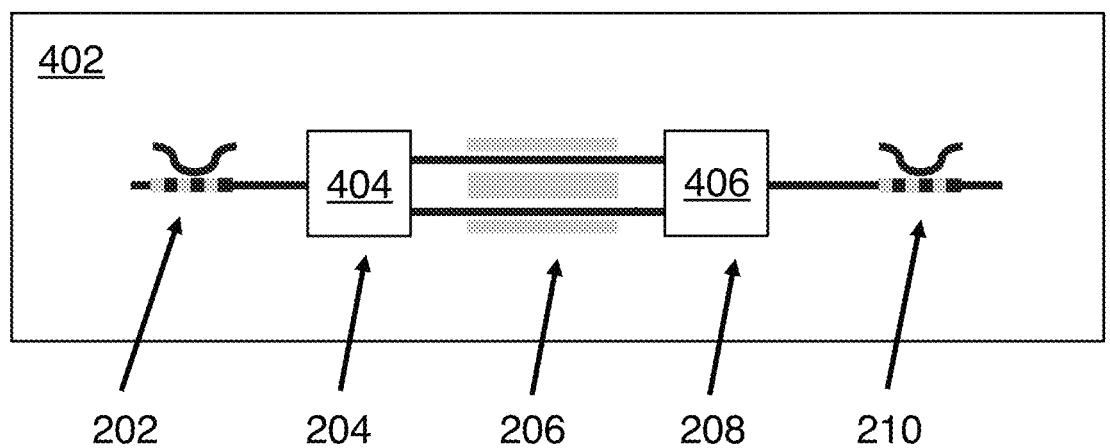
FIG. 4 schematically shows an integrated embodiment of the invention.

In one example, our Mach-Zehnder modulator includes two multimode interferometer (MMI) couplers 404 and 406 and a push-pull phase shifter 206 of length L, as shown on FIG. 4. Overall, FIG. 4 shows an integrated embodiment of the invention with squeezer 202, splitter 204, phase shifter 206, combiner 208 and anti-squeezer 210 all being monolithically integrated on a photonic chip 402. As described above, lithium niobate is a preferred material system for this integration, although any other material system having suitable properties can, in principle, also be used. Thus the example of this section relates to a situation where the splitter and combiner are implemented as MMI devices in photonic integrated circuit technology.

Our approach to constructing the MMI couplers is similar to those recently demonstrated in a heterogeneous lithium niobate platforms. However, our design integrates the entire photonic circuit on thin-film LN chip without the need for heterogeneous integration of multiple materials.

We have designed the modulation section of the Mach-Zehnder modulator with the same film thickness and etch depth as used in the squeezing sections so the components can be integrated in a straightforward fashion. We simulate a $V_\pi L$ value of 2.8 V-cm, using an electrode gap of 5.5 μm and a waveguide width of 1.4 μm. We expect a $V_\pi$ of 1.4 V for a 20 mm long device. We expect the proximity of the electrodes to the waveguides to causes negligible loss with a simulated value<0.01 dB/cm, which means the loss should not degrade the $V_\pi$ enhancement from squeezing.

B4) Discussion

The primary result of this work is a modulator with a quantum-enhanced mm-wave-optical conversion efficiency $\eta_c$. We calculated this for a modulator with sensitivity $V_\pi$ by first expressing the modulated light's amplitude as $$\alpha \exp(i\pi V/V_\pi) \approx \alpha(1 + i\pi V/V_\pi)$$

The flux of converted optical photons $\dot{N}_c$ from the mm-wave signal with voltage V(t) (leading to a photon flux $\dot{N}_{mm} \approx \langle V \rangle^2 / 2Z_0 \hbar \omega_{mm}$) is then given by squaring the second term in this expression, leading to $$\dot{N}_c = |\alpha|^2 \left(\frac{\pi}{V_\pi}\right)^2 \langle V \rangle^2 \quad (2.14)$$

$$= \dot{N}_{in}\left(\frac{\pi}{V_\pi}\right)^2 2Z_0 \hbar \omega_{mm} \dot{N}_{mm} \quad (2.15)$$

$$= 2Z_0 \frac{\omega_{mm}}{\omega_o}\left(\frac{\pi}{V_\pi}\right)^2 P_{in,opt} \dot{N}_{mm} \quad (2.16)$$

Typical values of $V_\pi \approx 4V$ lead to $$\eta_c = 2Z_0 \frac{\omega_{mm}}{\omega_o}\left(\frac{\pi}{V_\pi}\right)^2 P_{in,opt} \approx \frac{P_{in,opt}}{30 \text{ W}} \quad (2.17)$$

which for laser powers on the order of a few mW gives us $\eta_c \approx 10^{-3} - 10^{-4}$.

Improvements in this efficiency, especially over a broad bandwidth, will lead to improvements in electro-optic detection. With squeezing, we expect $$\eta_c \to e^{2r}\eta_c$$

which means that $\eta_c \approx 10^{-1}$ may be possible with 20 dB of squeezing.

For example, for radiometric measurements of optical fields, the Noise Equivalent Temperature Difference (NETD) which sets the temperature resolution of captured image is given by $$NETD = \frac{T + T_{added}}{\sqrt{B}} \quad (2.19)$$

where the added noise comes from the amplifiers and conversion inefficiency. In the absence of any noise due to amplification, $T_{added} = \hbar\omega / k\eta_c \approx 2K/\eta_c$. This means that achieving NETD on the order of 10 mK/√Hz is possible over a GHz of bandwidth for $\eta_c = 10^{-1}$ without pre-amplification if squeezing is utilized. This would lead to an extremely versatile, low-power, video-rate passive mm-wave imager.

The result of Eq. 2.19 depends on some assumptions about the detection chain. A heterodyne/homodyne measurement will lead to the formula of Eq. 2.19 while we believe that photon detection with the carrier removed leads to $$NETD = \frac{\sqrt{TT_{added}}}{\sqrt{B}}. \quad (2.20)$$

This is itself a significant improvement, and arises because no local oscillator shot noise is present in a direct detection scheme. An advantage of our scheme as opposed to other squeezed light schemes is that we can directly take advantage of this property of optical detection with the carrier removed.

More broadly, we expect that the present approach will also find application in a variety of sensors based on detecting phase shifts of optical fields. These sensors include a wide array of refractive index sensors, acousto-optic devices, and photonic displacement/acceleration sensors.

The invention claimed is:

1. Apparatus comprising:
   a squeezer configured to transform input coherent-state light to input squeezed-state light;
   a passive waveguide splitter configured to receive the input squeezed-state light, and configured to output first squeezed-state light and second squeezed-state light;
   a phase shifter configured to impose a relative phase shift between the first squeezed-state light and the second squeezed-state light according to an input of the phase shifter;
   a passive waveguide combiner configured to receive the first squeezed-state light and the second squeezed-state light from the phase shifter, and configured to provide output squeezed-state light;

an anti-squeezer configured to receive the output squeezed-state light and configured to provide output coherent-state light.

2. The apparatus of claim 1, wherein the squeezer, the passive waveguide splitter, the phase shifter, the passive waveguide combiner and the anti-squeezer are all included in an integrated photonic circuit having a waveguide-coupled optical input and having a waveguide-coupled optical output.

3. The apparatus of claim 2, wherein the integrated photonic circuit is a lithium niobate integrated photonic circuit.

4. The apparatus of claim 2, wherein the passive waveguide splitter is a multi-mode interference device.

5. The apparatus of claim 2, wherein the passive waveguide combiner is a multi-mode interference device.

6. The apparatus of claim 1, wherein the phase shifter is a phase modulator, wherein the input to the phase shifter is a provided electrical signal, whereby the apparatus is a modulator that modulates the output coherent-state light according to the provided electrical signal.

7. The apparatus of claim 1, wherein the phase shifter is a phase sensor, wherein the input to the phase shifter is an unknown signal, whereby the apparatus is a sensor of the unknown signal using the output coherent-state light.

* * * * *